United States Patent [19]
Hartman

[11] Patent Number: 6,000,888
[45] Date of Patent: Dec. 14, 1999

[54] QUICK COUPLER MECHANISM FOR POWER TOOL BITS

[75] Inventor: Robert L. Hartman, Milwaukee, Wis.

[73] Assignee: Snap-on Tools Company, Kenosha, Wis.

[21] Appl. No.: 09/249,422

[22] Filed: Feb. 12, 1999

[51] Int. Cl.$^6$ .......................... B23B 31/113; B25D 17/08
[52] U.S. Cl. .......................... 408/239 R; 173/71; 173/59; 279/91; 279/93; 403/348; 403/360
[58] Field of Search .................... 408/239 R; 279/89–91, 279/93, 904; 403/348, 360; 173/59, 71, 73, 132

[56] References Cited

U.S. PATENT DOCUMENTS

| | | |
|---|---|---|
| 1,424,743 | 8/1922 | Smith . |
| 1,526,565 | 2/1925 | Redmond . |
| 1,638,261 | 8/1927 | Henricson . |
| 1,697,868 | 1/1929 | Henricson ................................ 279/93 |
| 1,757,093 | 5/1930 | Norling . |
| 1,809,237 | 6/1931 | Halborg . |
| 1,886,177 | 11/1932 | Gairing . |
| 2,092,060 | 9/1937 | Gairing ..................................... 279/93 |
| 2,120,623 | 6/1938 | Oxford et al. . |
| 2,219,907 | 10/1940 | Ross ......................................... 279/93 |
| 2,526,998 | 10/1950 | Davis ....................................... 279/93 |
| 2,608,180 | 8/1952 | Curtis ..................................... 173/132 |
| 2,611,621 | 9/1952 | Patterson et al. ......................... 279/91 |
| 2,612,377 | 9/1952 | Edens ....................................... 279/22 |
| 2,955,573 | 10/1960 | Feucht ..................................... 173/59 |
| 3,679,220 | 7/1972 | Reeves ..................................... 279/89 |
| 4,125,077 | 11/1978 | Baaso ................................. 105/366 B |
| 5,174,696 | 12/1992 | Bogner ................................... 408/206 |
| 5,522,606 | 6/1996 | Pressley et al. ....................... 173/132 |

*Primary Examiner*—Steven C. Bishop
*Attorney, Agent, or Firm*—Emrich & Dithmar

[57] ABSTRACT

A pneumatic impact power tool has a tool body with a bit-receiving axial bore in its end surface. A cap is threaded on the end of the tool body and has an end wall spaced from the end surface to define a cavity and a lobed opening in the cavity matably receiving a like-lobed bit shank, the cavity being dimensioned to accommodate the lobes. Spring-biased balls project into the cavity from radial bores in the end cap to engage the shank lobes and bias them to a rotational position non-aligned with the opening lobes to inhibit removal. The cavity is dimensioned to afford a slight axial clearance to accommodate axial movement of the lobes. A cover on the end cap is recessed to receive the bias springs, retaining both the springs and the cover in place. The end cap has a annular channel communicating with an exhaust passage in the tool body and four exhaust ports in the end wall.

23 Claims, 2 Drawing Sheets

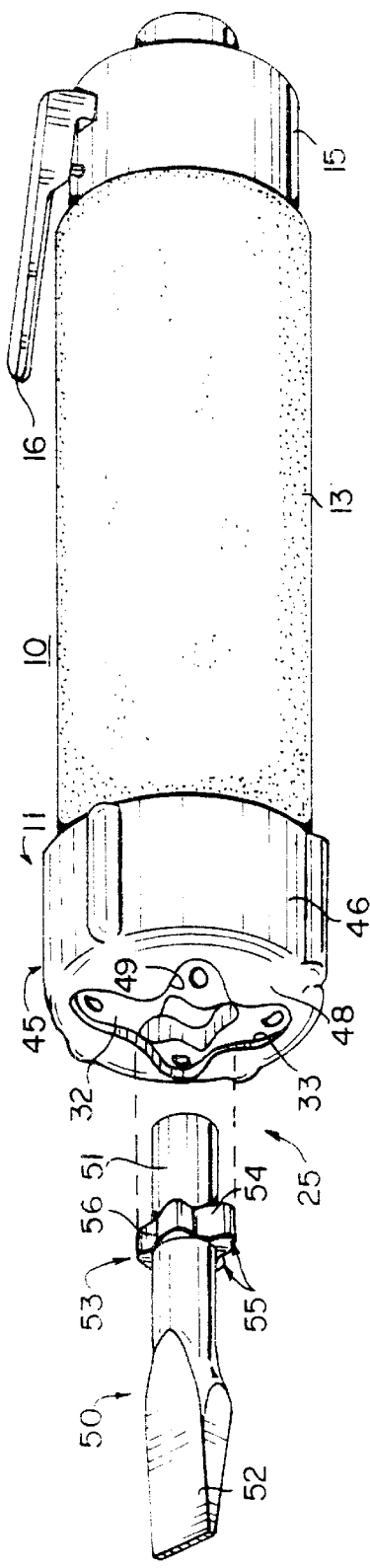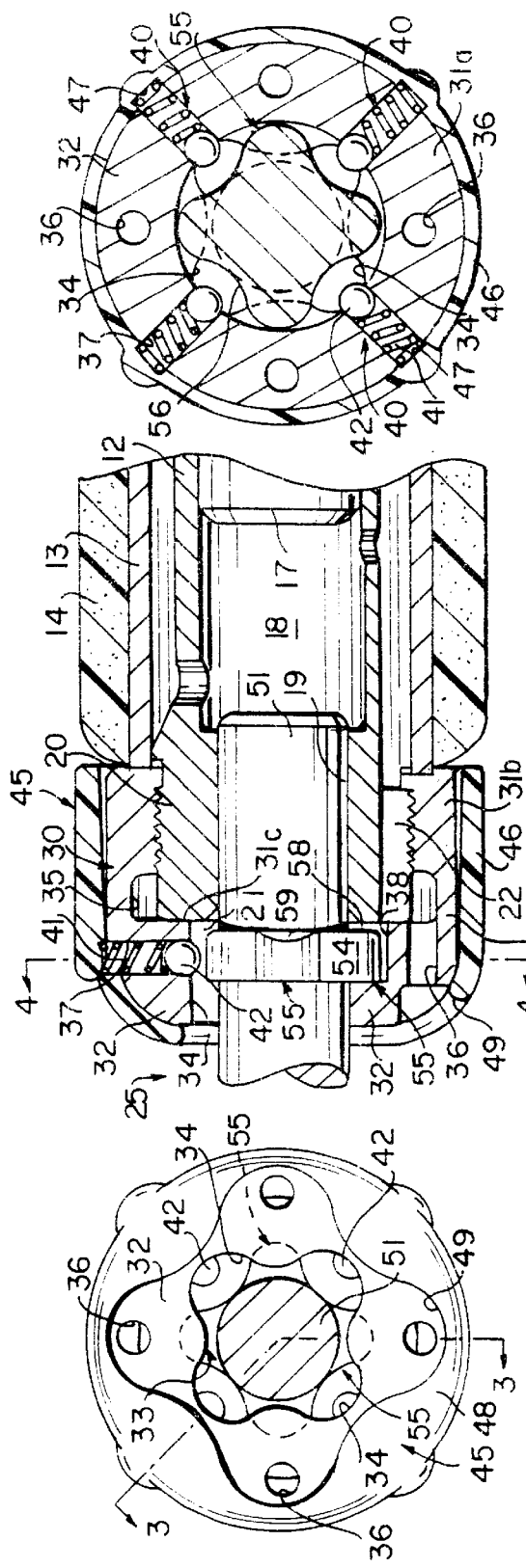

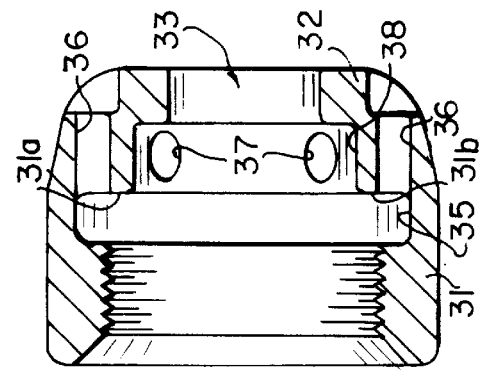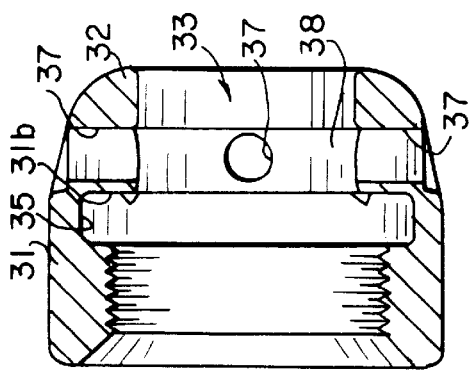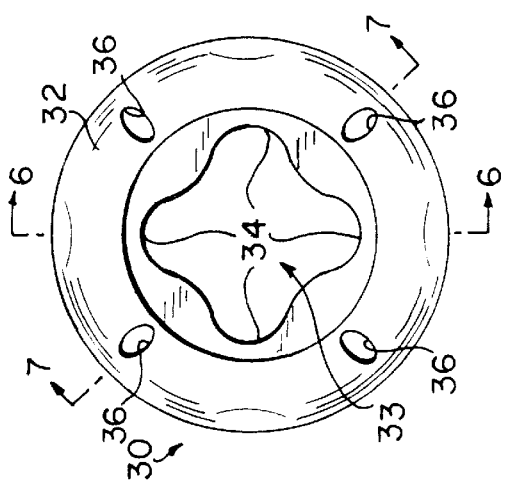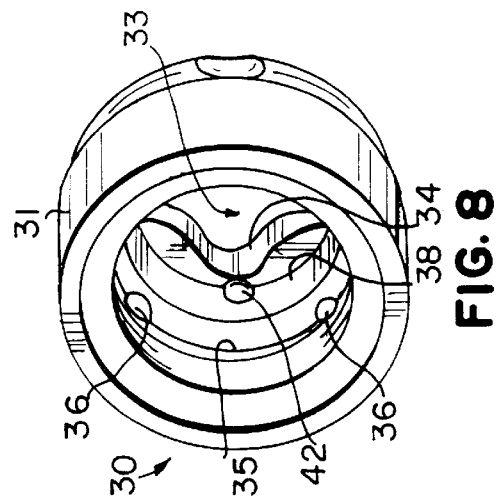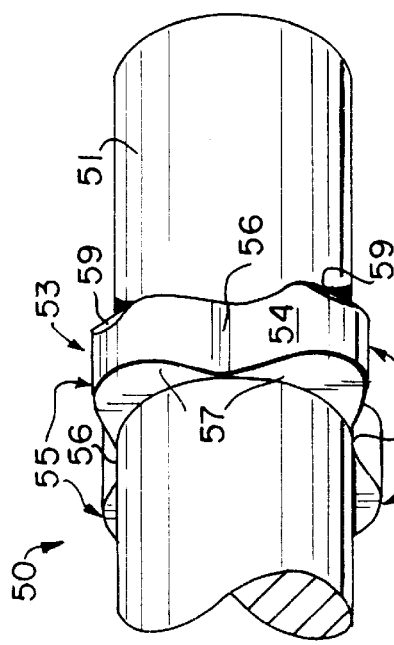

QUICK COUPLER MECHANISM FOR POWER TOOL BITS

BACKGROUND OF THE INVENTION

The present invention relates to coupling mechanisms for coupling power tools to tool bits and, more specifically, relates to the coupling of bits, such as chisel bits, for pneumatic impact tools.

Heretofore, power impact tools, such as air hammers and the like, have typically been provided with quick-coupling mechanisms for mounting tool bits. One common quick-coupling arrangement includes a coupler with spring-biased balls which project radially into a bit shank-receiving bore and engage a raised shoulder or flange on the bit shank. Upon insertion of the bit, the shoulder or flange snaps past the balls, which then cooperate with the flange to resiliently retain the bit in place. Such couplers rely on the spring-biased balls to provide the retention, the balls affording only line contact with the bit shoulder. Bits may inadvertently become disengaged from such couplers in use. Furthermore, the coupler mechanism is typically adapted to be mounted on the front end of the tool, substantially extending the overall length of the tool.

It is known in other types of tools to provide a quick-coupling of bits and the like by use of a keyed coupler with a keyway for receiving a key portion of the bit shank which, once inserted, is rotated to move the key out of alignment with the keyway to retain the bit in place. However, such rotatably latching coupling mechanisms have heretofore been provided with very specialized, and sometimes complicated designs.

SUMMARY OF THE INVENTION

It is a general object of the invention to provide an improved quick coupling mechanism for a power tool which avoids the disadvantages of prior such mechanisms while affording additional structural and operating advantages.

An important feature of the invention is the provision of a quick coupling mechanism of the type set forth, which provides improved tool bit retention.

A further feature of the invention is the provision of a quick coupling mechanism of the type set forth, which does not unduly extend the length of the tool and is readily adaptable for use with small tools.

Another feature of the invention is the provision of a quick coupling mechanism of the type set forth, which is especially adapted for use with pneumatically powered impact tools, affording a fluid exhaust path through the coupling mechanism.

A still further feature of the invention is the provision of a quick coupling mechanism of the type set forth which requires no manipulation by the user's hand holding the tool housing.

Another feature of the invention is the provision of a quick coupling mechanism of the type set forth, which is of simple and economical construction.

Certain ones of these and other features of the invention may be attained by providing a quick coupling mechanism for a power tool comprising: a tool housing having an end wall with an opening therethrough, the opening having plural first lobes; a tool bit with a shank having a longitudinal axis and plural second lobes arranged so that said shank is receivable axially in and removable axially from said opening in a first rotational orientation with said second lobes respectively axially aligned with said first lobes, said shank being receivable in said opening to an inserted position wherein said second lobes are disposed inwardly of said end wall; and a bias mechanism operable when said second lobes are in said inserted position for resiliently urging said lobes and said shank to a latched condition in a second rotational orientation with said second lobes out of axial alignment with said first lobes and cooperating with said end wall to inhibit removal of said shank from said housing.

Other features of the invention may be attained by providing a quick coupling mechanism of the type described, in which the end wall is formed in an end cap secured to the end of the tool body.

Still other features of the invention may be attained by providing a quick coupling mechanism of the type described, wherein the bias mechanism includes bias assemblies respectively disposed in radial bores in the end cap, with an end cap cover which both retains the bias assemblies in place and is retained in place thereby.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWING

For the purpose of facilitating an understanding of the invention, there is illustrated in the accompanying drawings a preferred embodiment thereof, from an inspection of which, when considered in connection with the following description, the invention, its construction a nd operation, and many of its advantages should be readily understood and appreciated.

FIG. 1 is a perspective view of a power tool and bit incorporating a quick coupling mechanism in accordance with the present invention, with the bit disengaged from the tool;

FIG. 2 is an enlarged end elevational view of the tool of FIG. 1 as viewed from the left-hand end thereof, with the bit shank engaged and illustrated in section;

FIG. 3 is a fragmentary sectional view taken generally along the line 3—3 in FIG. 2;

FIG. 4 is a s ectional view taken generally along the line 4—4 in FIG. 3;

FIG. 5 is a front elevational view of the end cap of the tool of FIG. 1;

FIG. 6 is a sectional view taken generally along the line 6—6 in FIG. 5;

FIG. 7 is a sectional view taken generally along the line 7—7 in FIG. 5;

FIG. 8 is a rear perspective view of the end cap of FIG. 5, illustrating one of the detent balls; and FIG. 9 is an enlarged, fragmentary, perspective view of a portion of the shank of the tool bit of FIG. 1.

DESCRIPTION OF THE PREFERRED EMBODIMENT

Referring to FIG. 1, there is illustrated a power tool, generally designated by the numeral 10, which is a pneumatic impact tool of the type for use with interchangeable tool bits, such as a chisel tool bit 50, the bits being coupled to the tool by means of a quick coupler mechanism 25 in accordance with the present invention. Referring also to FIGS. 2–4, the power tool 10 is a pneumatically powered tool and has a housing 11 including an elongated cylindrical inner body 12 (FIG. 3) and an end cap 30. The housing 11 also includes a cylindrical sleeve 13 encircling the inner body 12 and provided on its outer surface with a cushioning grip sheath 14, preferably formed of a suitable elastomeric material. The tool 10 has a pneumatic coupler 15 at the rear end of the housing 11 adapted to be coupled to a source of pneumatic fluid, such as pressurized air, the coupler 15 being provided with a manually-operated trigger 16, all in a well-known manner. The tool 10 includes a standard pneumatic impact motor (not shown), which includes a hammer 17 which is reciprocated in a chamber 18 for repeatedly impacting the tool bit 50, also in a known manner. The inner body 12 has an externally threaded neck 20 at one end thereof with a circular end face 21 in which is formed an axial bore 19 which communicates with the chamber 18, for receiving the associated tool bit, as will be explained more fully below. Formed in the housing 11 is an exhaust passage 22 which exits at the front end of the neck 20.

While a pneumatic impact tool 10 is described for purposes of illustration, it will be appreciated that the general principles of the quick coupler mechanism 25 of the present invention may be applicable to other types of tools.

The quick coupler mechanism 25 includes cooperating portions of the end cap 30 and the tool bit 50. Referring also to FIGS. 5–8, the end cap 30 is a generally cup-shaped member having a generally cylindrical side wall 31, which has a relatively thick forward portion 31a (FIGS. 4 and 7) and a thinner internally threaded rearward portion 31b for threaded engagement with the threaded neck 20 of the tool body 12, as is best seen in FIG. 3, the portions 31a and 31b being joined at an annular shoulder 31c. The side wall 31 is unitary at its forward end with an end wall 32, which has an opening 33 formed therethrough centrally thereof. The opening 33 has four arcuate lobes 34 substantially equiangularly spaced-apart and identically shaped and dimensioned, each lobe 34 being substantially arcuate in shape. Formed in the inner surface of the side wall 31, just rearwardly of the shoulder 31c, is an annular groove or channel 35, which communicates with four equiangularly spaced exhaust ports 36 formed through the end wall 32, the ports 36 being respectively angularly spaced about 45° from the opening lobes 34. Also formed through the side wall 31 forwardly of the annular groove 35 are four equiangularly spaced radial bores 37, respectively having radial axes aligned axially of the tool 10 with the radial axes of the opening lobes 34. The inner ends of the radial bores 37 communicate with an annular cavity 38 just inwardly of the end wall 32, the cavity 38 having a radius which is substantially the same as the radial distance from the central axis of the tool 10 to the apices of the opening lobes 34.

The end cap 30 carries a bias mechanism which includes four bias assemblies 40, respectively disposed in the radial bores 37. Referring in particular to FIGS. 2–4, each of the bias assemblies 40 includes a helical compression spring 41 and a detent ball 42 which projects into the annular cavity 38 immediately behind the apex of the corresponding one of the opening lobes 34. It will be appreciated that the inner ends of the radial bores 37 are peeled over to provide an annular lip (not shown) to retain the ball 42 in the associated radial bore 37, in a known manner.

The end cap 30 is provided with a cover 45 which is also generally cup-shaped, having a substantially cylindrical side wall 46 which has formed in its inner surface four equiangularly spaced-apart recesses 47 for respectively receiving the outer ends of the compression springs 41, as can best be seen in FIGS. 3 and 4. The cover 45 also has an end wall 48 which has formed therethrough a large lobed aperture 49, which exposes the opening 33 in the end cap 30 and has lobes which expose the exhaust ports 36. It will be appreciated that the engagement of the springs 41 in the recesses 47 serves to both retain the springs 41 in the end cap bores 37 and to retain the cover 45 in place on the end cap 30. However, other means could be utilized to retain the cover 45 in place.

Referring also to FIG. 9, the tool bit 50 is a chisel bit, although it will be appreciated that the principles of the invention would apply to other types of tool bits. The tool bit 50 has an elongated cylindrical shank 51 provided at the working end with a chisel blade 52. Formed on the shank 51 intermediate its ends and projecting radially outwardly therefrom is a lobed shoulder or flange 53, which has an outer peripheral surface which defines four equiangularly spaced-apart lobes 55 separated by valleys 56. Each of the lobes 55 and valleys 56 is arcuate in shape, so that the shoulder 53 has a continuously curved profile. Preferably, the shoulder 53 has a radius at the deepest point of each valley 56 which is substantially equal to the radius of the remainder of the shank 51. Each of the lobes 55 has substantially flat, planar front and rear faces 57 and 58 (FIG. 3) lying in planes substantially perpendicular to the longitudinal axis of the shank 51, the rear faces 58 preferably being chamfered as at 59, at their radially outer ends.

In assembly, the bias assemblies 40 are inserted in the radial bores 37 of the end cap 30 and then the cover 45 is mounted in place on the end cap 30. The end cap 30 is then threaded onto the neck 20 of the power tool body 12 to a fully assembled position, illustrated in FIG. 3, with the rear end of the side wall 31 abutting the front end of the housing sleeve 13, and with the shoulder 31c abutting the end face 21 of the neck 20. In this assembled condition, the exhaust passage 22 of the tool 10 communicates with the annular groove or channel 35 in the end cap 30 to permit air to exhaust forwardly through the exhaust ports 36 of the end cap 30.

In order to mount the tool bit 50 in the housing 11, the rear end of the shank 51 is inserted through the aperture 49 in the cover 45 and the opening 33 of the end cap 30 into the axial bore 19 in the neck 20. In order to permit full insertion, the lobes 55 on the tool bit 50 must, respectively, be aligned with the lobes 34 of the end cap opening 33. In this regard, it will be appreciated that the lobes 55 are, respectively, substantially identical in size and shape to the lobes 34. As the rear faces 58 of the tool bit lobes 55 enter the annular cavity 38 of the end cap 30, they engage the detent balls 41 at the chamfers 59, permitting the lobes 55 to cam past the balls 41, retracting the balls 42 into the radial bores 37 against the urging of the springs 41. Insertion depth is limited by engagement of the tool bit lobes 55 with the end face 21 of the tool body neck 20.

In this fully inserted position, the tool bit lobed shoulder 53 is disposed entirely within the end cap cavity 38. In this regard, it will be appreciated that the cavity 38 preferably has an axial depth slightly greater than the axial thickness of the lobed shoulder 53 to permit slight axial movement of the tool bit 50 in use. Because the lobes 55 are arcuate in shape, they make essentially point contact with the detent balls 42 at the apices of the lobes 55. This is an unstable condition and the force of the springs 41 on the balls 42 will tend to urge the balls down along one side or the other of the lobes 55, imparting a slight rotational movement to the tool bit 50, thereby moving the lobes 55 out of alignment with the end cap opening lobes 34 and into a latched condition, best illustrated in FIGS. 2 and 4. In this latched condition, the tool bit lobes 55 are trapped behind the end wall 32 of the end cap 30, effectively locking the bit 50 in place. The force of the springs 41 will tend to inhibit inadvertent movement of the tool bit 50 back to the inserting position.

When it is desired to remove the tool bit 50, it is pulled axially outwardly and simultaneously rotated against the urging of the spring-biased balls 42. When the tool bit lobes 55 come back into axial alignment with the end cap opening lobes 34, the bit lobes 55 will pass through the opening 33 and permit removal of the bit.

From the foregoing, it can be seen that there has been provided an improved quick coupling mechanism which is of simple and economical construction and provides positive latching of a tool bit in a power tool while minimizing the size of the assembly.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A quick coupling mechanism for a power tool comprising:
   a tool housing having an end wall with an opening therethrough, the opening having plural first lobes;
   a tool bit with a shank having a longitudinal axis and plural second lobes arranged so that said shank is receivable axially in and removable axially from said opening in a first rotational orientation with said second lobes respectively axially aligned with said first lobes,
   said shank being receivable in said opening to an inserted position wherein said second lobes are disposed inwardly of said end wall; and
   a bias mechanism operable when said second lobes are in said inserted position for engaging said second lobes and resiliently urging said second lobes and said shank circumferentially to a latched condition in a second rotational orientation with said second lobes out of axial alignment with said first lobes and cooperating with said end wall to inhibit removal of said shank from said housing.

2. The quick coupling mechanism of claim 1, wherein the opening has four first lobes and the shank has four second lobes.

3. The quick coupling mechanism of claim 1, wherein each of said lobes is arcuate in shape.

4. The quick coupling mechanism of claim 3, wherein said bias mechanism includes a plurality of spring-biased balls equal in number to said second lobes.

5. The quick coupling mechanism of claim 4, wherein said tool housing includes a plurality of radial bores in which said spring-biased balls are respectively disposed.

6. The quick coupling mechanism of claim 4, wherein each of said lobes has a rear face chamfered to facilitate camming engagement with an associated one of said balls.

7. The quick coupling mechanism of claim 1, wherein said power tool is a pneumatically operated tool and said end wall includes a plurality of exhaust ports.

8. The quick coupling mechanism of claim 1, wherein said tool bit is a chisel bit.

9. The quick coupling mechanism of claim 8, wherein said housing includes a cavity inwardly of said end wall having an axial depth slightly greater than the axial thickness of said second lobes to accommodate limited axial movement of said shank in its latched condition.

10. A quick coupling mechanism for a power tool comprising:
    an elongated tool body having an end surface with an axial bore formed therein;
    an end cap secured to the tool body and having an end wall spaced axially from said end surface for cooperation therewith to define a cavity therebetween, said end wall having formed therethrough an opening with plural first lobes;
    a tool bit with a shank having plural second lobes arranged so that said shank is receivable axially in and removable axially from the bore in a first rotational orientation with said second lobes axially aligned with said first lobes,
    said shank being receivable in said bore to an inserted position wherein said second lobes are disposed in said cavity; and
    a bias mechanism operable when said second lobes are in said cavity for resiliently urging said second lobes and said shank to a latched condition in a second rotational orientation with said second lobes out of axial alignment with said first lobes and cooperating with said end wall to inhibit removal of said shank from said bore.

11. The quick coupling mechanism of claim 10, wherein said end cap is threadedly engaged with said tool body.

12. The quick coupling mechanism of claim 10, wherein said bias mechanism is carried by said end cap.

13. The quick coupling mechanism of claim 12, wherein said end cap includes a plurality of radial bores communicating with said cavity, said bias mechanism including a plurality of bias assemblies respectively disposed in said radial bores.

14. The quick coupling mechanism of claim 13, wherein each of said bias assemblies includes a detent ball projecting into said cavity and a bias spring resiliently urging the ball toward the cavity.

15. The quick coupling mechanism of claim 14, wherein each of said lobes has an arcuate periphery and an inner surface chamfered to facilitate engagement with the associated ball.

16. The quick coupling mechanism of claim 10, wherein the power tool is pneumatically powered, the tool body having an exhaust passage and said end cap having an annular exhaust channel communicating with said passage and a plurality of exhaust ports formed through said end wall and communicating with said passage.

17. The quick coupling mechanism of claim 10, wherein said second lobes have an axial thickness slightly less than the axial extent of said cavity so that in the inserted position of said shank there is axial clearance for said second lobes and said end wall and said end surface.

18. A quick coupling mechanism for a power tool comprising:
    an elongated tool body having an end surface with an axial bore formed therein;
    an end cap having a side wall secured to the tool body and an end wall spaced axially from said end surface for cooperation therewith to define a cavity,
    said side wall having a plurality of circumferentially spaced radial bores therein communicating with said cavity and said end wall having formed therethrough an opening with plural first lobes communicating with said cavity;

a tool bit with a shank having plural second lobes arranged so that said shank is receivable axially in and removable axially from the axial bore in a first rotational orientation with said second lobes axially aligned with said first lobes, said shank being receivable in said bore to an inserted position wherein said second lobes are disposed in said cavity; and a plurality of bias assemblies respectively disposed in said radial bores and projecting into said cavity and operable when said second lobes are in said cavity for resiliently urging said second lobes to a latched condition in a second rotational orientation with said second lobes out of axial alignment with said first lobes and cooperating with said end wall to inhibit removal of said shank from said housing; and a cover on said end cap overlying said radial bores for retaining said bias assemblies therein.

19. The quick coupling mechanism of claim 18, wherein the power tool is pneumatically powered, the tool body having an exhaust passage and said end cap having an annular exhaust channel communicating with said passage and a plurality of exhaust ports formed through said end wall and communicating with said passage.

20. The quick coupling mechanism of claim 19, wherein said cover has an end wall portion with an aperture therein shaped and dimensioned to expose said opening and said exhaust ports.

21. The quick coupling mechanism of claim 19, wherein said tool bit is a chisel bit.

22. The quick coupling mechanism of claim 21, wherein said cavity has an axial depth slightly greater than the axial thickness of said second lobes to accommodate limited axial movement of said tool bit in its latched condition.

23. The quick coupling mechanism of claim 18, wherein said cover has plural recesses respectively radially aligned with said radial bores and respectively receiving said bias assemblies to retain said cover in place.

* * * * *